Nov. 20, 1934.  J. R. RITCHIE  1,981,287
BULLDOZER
Filed June 15, 1929  3 Sheets-Sheet 3
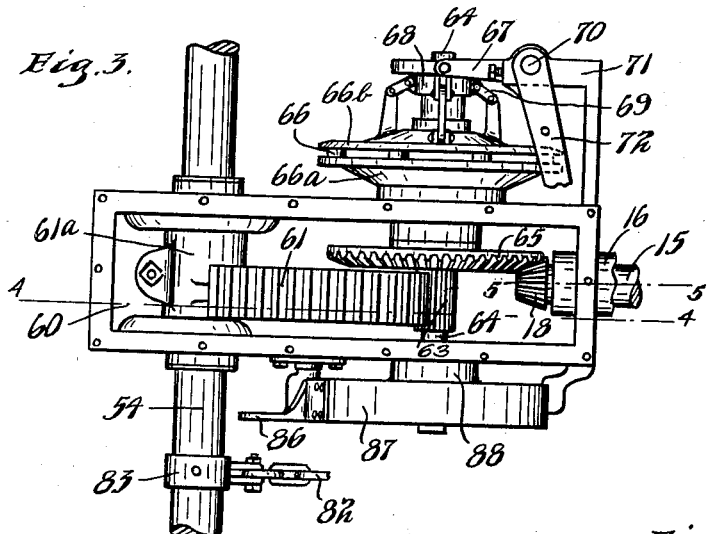
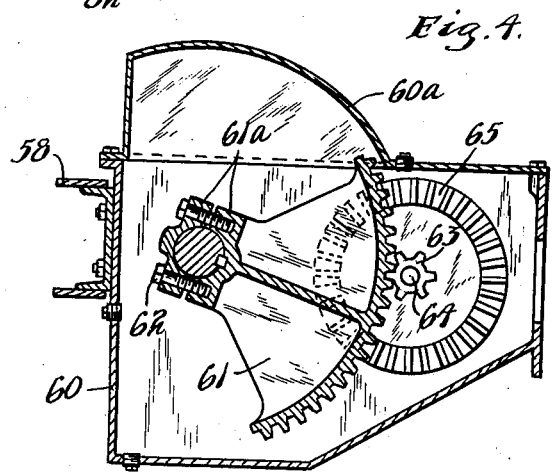
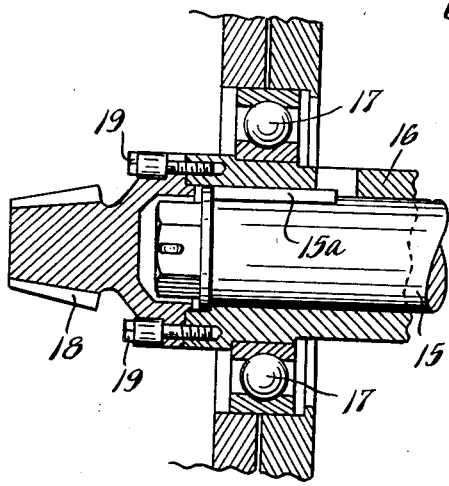
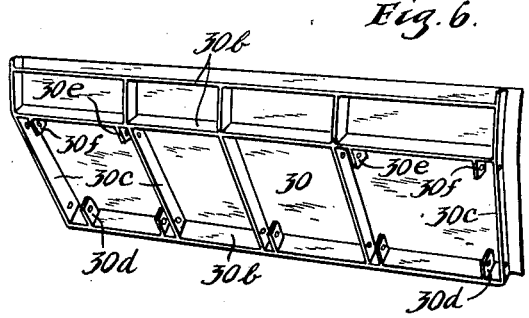
INVENTOR.
JOHN R. RITCHIE.
BY HIS ATTORNEYS.

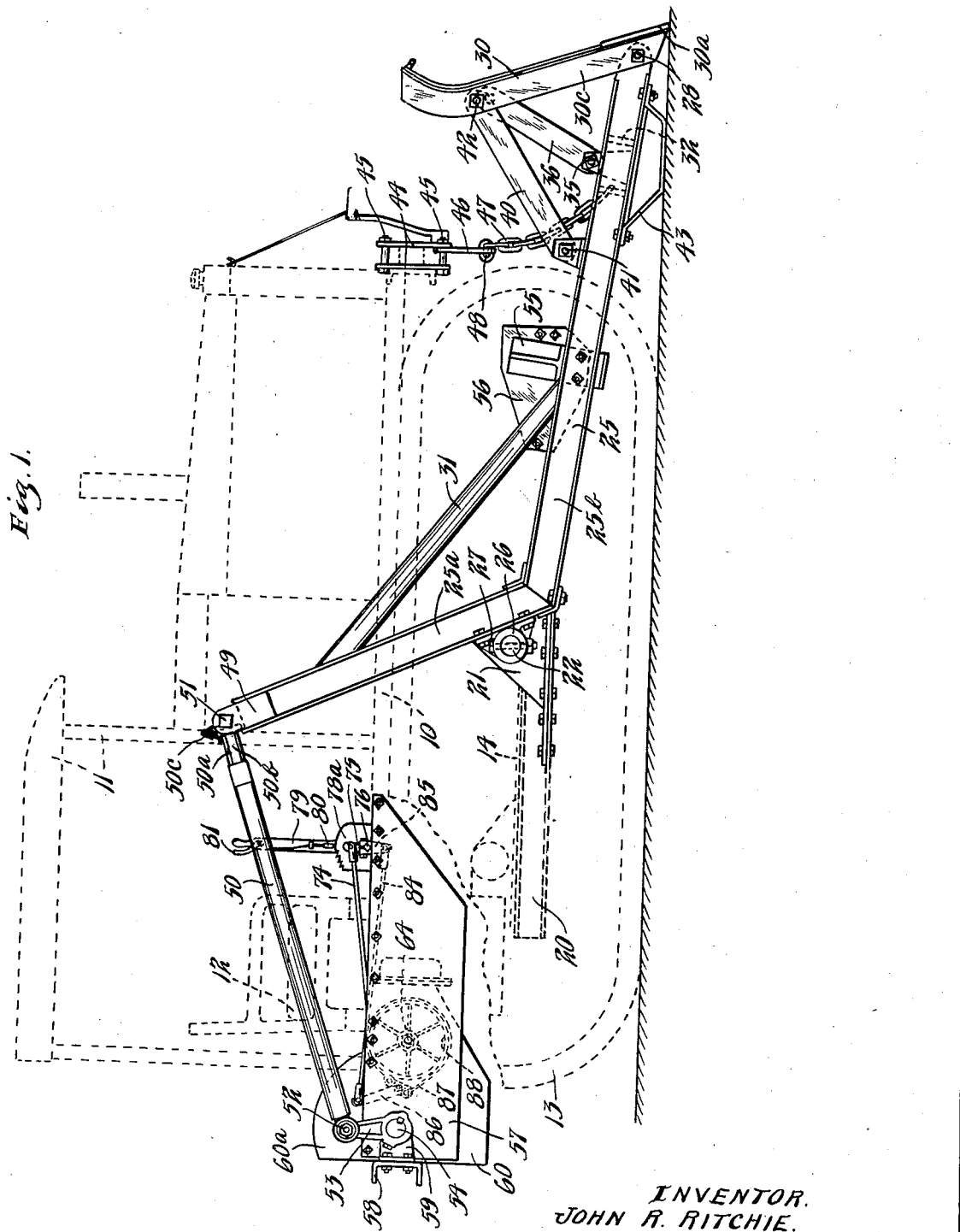

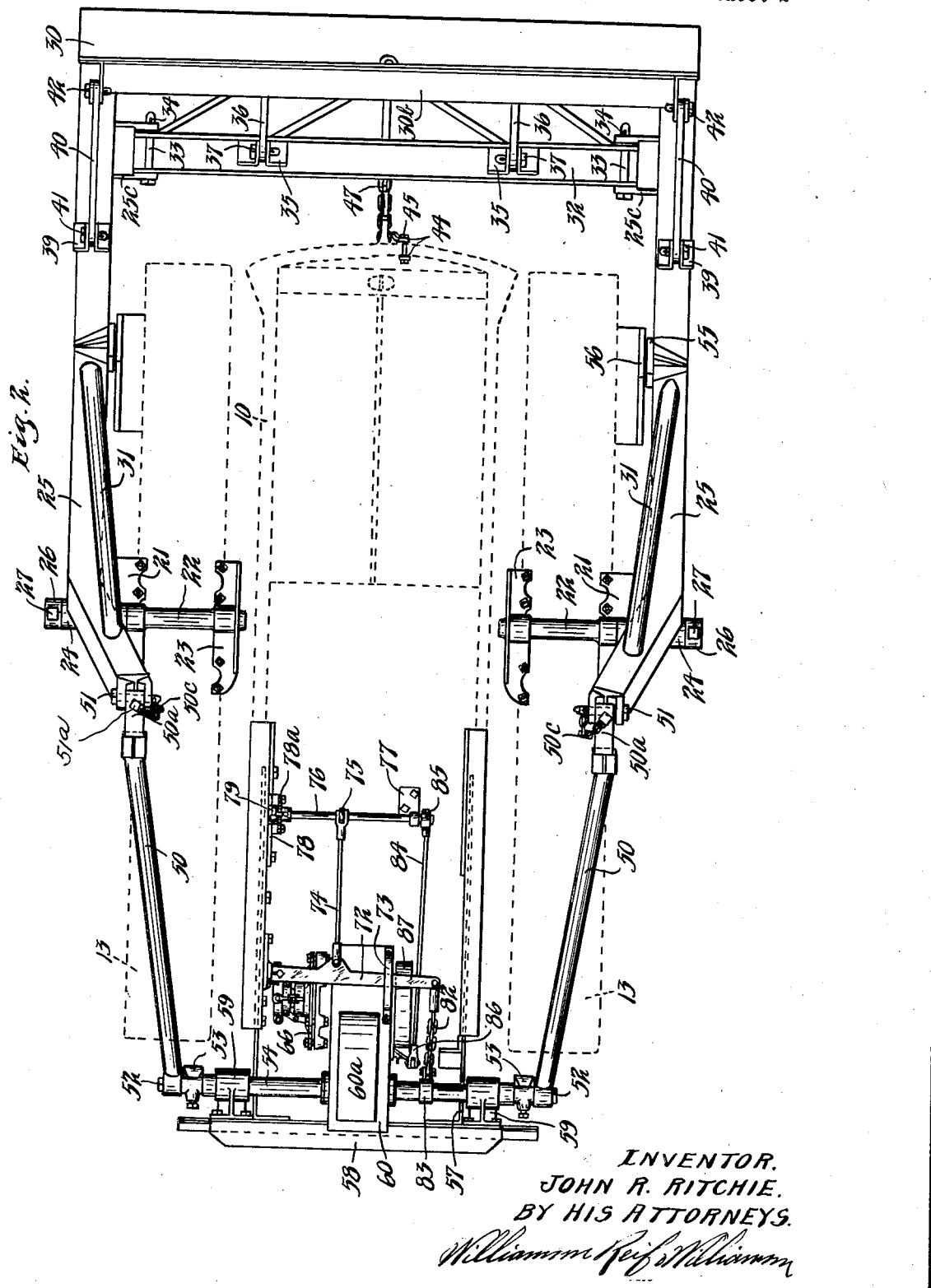

Patented Nov. 20, 1934

1,981,287

UNITED STATES PATENT OFFICE 1,981,287

BULLDOZER

John R. Ritchie, Minneapolis, Minn., assignor to Niess and Company, Inc., Minneapolis, Minn., a corporation of Minnesota Application June 15, 1929, Serial No. 371,088

26 Claims. (Cl. 37—144)

This invention relates to a machine for pushing and moving dirt, stones and similar material and which is commonly known as a bulldozer. It is desirable in such machines to have a strong and rugged construction comprising a member such as a blade for moving the material which blade can be raised and lowered. It is also desirable to have an easily operated and controlled power means for raising the blade together with means for holding it in various positions.

It is an object of this invention, therefore, to provide such a machine having a blade at its forward end carried on members mounted at each side of the propelling means, such as a tractor, together with means operated from the transmission mechanism of the tractor for raising and lowering said blade.

It is a further object of the invention to provide a machine of the bulldozer type conveniently mounted upon a tractor frame and comprising a blade at the front of the tractor, together with means adapted to be connected to and disconnected from the transmission mechanism of the tractor for raising and lowering the blade and means for holding the blade in various positions.

It is still another object of the invention to provide a machine of the bulldozer type conveniently mounted upon a tractor to be driven thereby having a blade extending transversely at the front of the tractor, levers connected to said blade and having fulcrum means on said frame and having upwardly and rearwardly extending arms, a shaft mounted in said tractor frame and extending transversely thereof, arms connected to said shaft, means pivotally connecting said arms and the arms of said levers respectively and means adapted to be connected to the transmission mechanism of the tractor for operating said shaft to swing said levers and blade.

It is a further object of the invention to provide a machine of the bulldozer type mounted on and connected to a tractor which propels the same, comprising a blade at the front of the tractor, swinging means carrying the blade, a shaft journaled at the rear of the tractor connected to said blade, a beveled gear driven from the transmission mechanism of the tractor, a shaft on which said beveled gear is journaled, a gear carried by said last mentioned shaft and meshing with a segment carried by said first mentioned shaft to oscillate the latter, a clutch mechanism for connecing said last mentioned shaft and beveled gear to drive said last mentioned shaft and a brake mechanism connected to said last mentioned shaft.

These and other objects and advantages of the invention will be fully set forth in the following description made in connection with the accompanying drawings, in which like reference characters refer to similar parts throughout the several views, and in which:—

Fig. 1 is a view in side elevation of the machine, the tractor being indicated in dotted lines;

Fig. 2 is a plan view thereof, the tractor being shown in dotted lines;

Fig. 3 is a partial plan view similar to Fig. 2 having a casing cover removed;

Fig. 4 is a vertical section taken on line 4—4 of Fig. 3 as indicated by the arrows, Fig. 5 is a vertical section taken on line 5—5 of Fig. 3 as indicated by the arrows, and Fig. 6 is a perspective view of the rear side of the blade.

Referring to the drawings, a tractor of standard type is indicated in dotted lines in Figs. 1 and 2, comprising longitudinally extending frame members 10, the cab 11, the driver's seat 12, endless tracks 13, and the frame portions 14 within the endless tracks 13. In Figs. 3 and 5 a shaft 15 is shown which extends rearwardly from the transmission mechanism of the tractor, said shaft as shown in Fig. 5 being secured to a sleeve 16 as by the key 15a, which sleeve is mounted in ball bearings 17. Sleeve 16 has secured to its rear end a beveled gear or pinion 18 as by the screws or bolts 19.

Frame members 20 are provided, which are illustrated as in the form of channel bars or beams which are rigidly secured to the frame members 14 of the tractor. In accordance with the present invention, each member 20 has secured thereto the bracket 21 in which is mounted the fulcrum shaft 22, which is also secured in a bracket 23 bolted to a portion of the tractor inward of member 20. The shaft 22 is embraced by the bearing bracket 24 oscillatable on said shaft which bracket is bolted to the upwardly and rearwardly extending arm 25a of an angle lever 25 illustrated as made of channel bars. A collar 26 is secured to the outer end of shaft 22 by the headed and nutted bolt 27. Lever 25a has a forwardly extending arm 25b which extends to the front of the tractor and is connected by the headed and nutted bolt 28 to a flange 30c rigidly connected to a blade member 30, said blade member extending from its bottom edge upwardly and rearwardly and having its top portion curved somewhat forwardly. Blade 30 has an extra heavy plate 30a at its bottom portion and is reenforced by longitudinally extending ribs 30b and spaced transversely extending ribs 30c, which ribs may be made of angle irons welded to the main portion of said blade. The end of arm 25b of lever 25 is received between the end rib 30c and a lug 30d. The ends of levers 25a and 25b are further connected and braced by a strut 31 shown as of cylindrical form and which is rigidly secured to arms 25a and 25b preferably by welding. It will be understood that there is one of each of the parts 20 to 28 at each side of the tractor. Blade 30 is additionally connected to the arms 25b by a transverse beam 32 the ends of which are received between lugs 25c projecting inwardly from arms 25b, said lugs and member 32 being connected by a headed pin or bolt 33, held in place by a cotter pin 34. Member 32 has pairs of spaced lugs 35 secured thereto in which are pivoted arms or links 36 which extend upwardly and are connected to the rear of blade 30 by being disposed between one of the vertical ribs 30c and lugs 30e. Headed pins or bolts 37 held in place by cotter pins connect arms 36 and lugs 35 and similar bolts 38 connect said arms to the lugs 30e. The arms 25b also have secured to their upper sides spaced lugs 39 and arms or links 40 extend between lugs 39 and are pivoted thereto by the headed bolts or pins 41 held in place by cotter pins. The arms 40 at their upper ends are pivoted to lugs 30f depending from one of the longitudinal ribs 30b of the blade 30 and are secured by headed bolts or pins 42 also held in place by cotter pins. Arms 25b have runners 43 bolted to their lower sides adjacent their front ends. A pair of narrow plates 44 embrace and are bolted to the front portion of the tractor frame, the same being clamped to said frame by bolts 45. A plate 46 depends from the lower bolt 45 and is slotted to receive the end link of a chain 47, said end link being held in plate 46 by a pin 48. The lower end of chain 47 is connected centrally to the central portion of beam 32. Arms 25a have secured in their upper ends forked members 49 between the sides of which extend the end portions 50a of links 50. The end portion 50a is provided with a longitudinal slot 50b and a headed pin 51 is adapted to extend through member 49 and said slot, said pin being held in place by a cotter key. A headed pin 51a, secured to link 50 by a chain 50c, is adapted to extend through a hole in said link in the rear of pin 51. The other end of link 50 has a bearing pivotally connected by a headed pin or bolt 52 to the end of an arm 53. The arms 53 are respectively connected to the ends of a shaft 54 extending transversely of the tractor adjacent the rear end thereof. The arms 25b have brackets 55 bolted to their inner sides intermediate their ends which brackets have flat inner sides and are adapted to engage friction plates 56 which are bolted to the tractor frame. Members 55 and 56 form guides preventing any appreciable lateral movement of levers 25.

Plates 57 are bolted to the frame members 10 of the tractor adjacent the rear end and carry a rear channel plate 58. Plate 58 has bearing brackets 59 bolted thereto and extending forwardly therefrom in which shaft 54 is journaled. Shaft 54 extends through a gear casing 60 provided with a suitable cover 60a and within said casing has clamped thereto the hub 61a of a gear segment 61, said hub being in two parts connected by the bolts 62. Segment 61 meshes with a pinion 63 preferably formed integral with the shaft 64 which extends transversely of casing 60 and is journaled in bearings at the sides thereof. A beveled gear 65 is provided journaled on shaft 64 and meshing with the pinion 18 already described. A clutch 66 is provided, one member 66a of which is carried by gear 65 and the other member 66b of which is secured to shaft 64. Said clutch is operated by clutch fork 67 moving a clutch collar 68 which is connected by links 69 to arms projecting from member 66b. Clutch fork 67 is secured to a shaft 70 journaled in a bracket 71 extending from casing 60 and a lever 72 is secured to shaft 70. Lever 72 extends across casing 60 and beneath a strap bracket 73 secured to the top of said casing. Said lever has a lug or extension intermediate its ends to which is pivotally connected one end of a link 74. The other end of said link is bifurcated and embraces and is pivoted to an arm 75 secured to a transversely extending lever shaft 76 journaled in bearings 77 and 78, the latter of which is secured to one of the plates 57 and the former of which is secured to a portion of the tractor. Bearing 78 has formed thereon a toothed segment 78a. A hand lever 79 is secured to shaft 76 and carries a pawl 80 operated by a grip handle 81 which pawl is adapted to engage the teeth of segment 78a. It will be seen that when lever 79 is swung in one direction the clutch 66 will be engaged. The other end of lever 72 is pivotally secured to a flexible member, such as a chain 82 secured at its other end to an arm 83 secured to shaft 54. Another link rod 84 is secured to a downwardly extending arm 85 which in turn is secured to shaft 76 and rod 84 extends to and is connected to the end of an arm 86 connected to the ends of a brake band 87 embracing a brake drum 88 secured to the end of shaft 64 opposite clutch 66 and outside of the casing 60.

In operation when the brake lever 79 is in released position the levers 25 swing about the fulcrum shaft 22 and the blade 30 will rest as shown in Fig. 1 on the runners 43. The machine can be operated with the blade in this position by propelling the same by the tractor. The thrust will be taken by the shafts 22 and transmitted to the frame of the tractor. The weight and strain are thus carried low down on the frame of the tractor and at an intermediate point therein so that a very stable structure is produced, especially as the shafts 22 are located substantially at the center of the tractor. The blade 30 can be raised by the operator moving the lever 79 forwardly which will engage the clutch 66 and connect beveled gear 65 to shaft 64. As beveled gear 65 is driven by the pinion 18 connected to the transmission of the tractor, shaft 64 is thus driven and pinion 63 will be rotated thus oscillating segment 61. This oscillates shaft 54 and arms 53. Arms 53 pull rearwardly on the links 50 and swing the arms 25a downwardly thus swinging arms 25b of lever 25 upwardly and lifting the blade 30. When the blade reaches its limit of movement arm 83 on shaft 54 pulls on chain 82 thus swinging lever 72 rearwardly and throwing out clutch 66. This provision is made to keep segment 61 from running off of pinion 63. The clutch can be thrown out and the brake band 87 applied to brake drum 88 at any position of blade 30 and said blade can thus be held in various positions and at various degrees of elevation. It is often desirable to operate the bulldozer with the blade somewhat above the surface. Lever 79 has three positions, a neutral position when said lever is substantially in a vertical position, the forward position which engages the clutch 66, while the brake 87 remains loosened and a rearward position in which the brake is locked and the clutch remains disengaged. Additional lifting movement of blade 30 is permitted by movement of pin 51 in slot 50b. It will thus be seen that the blade is conveniently raised, dropped or locked in any position by operation of lever 79 which is in a convenient position for manipulation by the driver of the tractor.

The blade is locked by inserting pin 51a in the rear of pin 51 and the blade can be propelled in this locked position. The blade 30 is very ruggedly made and braced and the parts securely welded together. The chain 47 is provided to limit the downward movement of blade 30 when it drops below the surface supporting the tractor, as is often the case where dirt is pushed over a bank or down a hill. The blade is thus supported in such cases and the weight of the blade overcomes the tendency of the tractor to raise when under a heavy load. The blade being supported at each side of the tractor, the lifting strain is very equally distributed. By having the propelling or pushing point at shaft 22 substantially in the middle of the track 13 of the tractor, the rise and fall of the tractor when traveling on uneven ground has the least effect on the position of blade 30. The friction or rub plates 56 prevent any damage to the tractor parts and permit of quick turning of the tractor.

From the above description it is seen that applicant has provided a bulldozer having few parts, which parts are made quite rugged and are very effectively mounted on strong and rugged members secured to the tractor frame. The blade of the machine is easily and positively controlled by the driver of the tractor and power is furnished for lifting the blade from the transmission of the tractor. The machine has been amply demonstrated in actual practice and found to be very successful and efficient.

It will, of course, be understood that various changes may be made in the form, details, proportions and arrangement of the parts without departing from the scope of applicant's invention, which generally stated, consists in a device capable of carrying out the objects above set forth, in the novel parts and combinations of parts disclosed and defined in the appended claims.

What is claimed is:—

1. A bulldozer having in combination with a tractor having a frame member, an angle lever having a fulcrum pivot adjacent the vertex of its angle and supported on said frame member, one end of said lever extending in a forwardly direction, a blade secured to the front end of said lever extending transversely in front of said tractor, the other end of said lever extending upwardly and rearwardly, a shaft extending transversely of said tractor, an arm carried by said shaft, a link pivotally connected at one end to said last mentioned member and at its other end to said upwardly extending arm of said lever and means adapted to be connected to and driven by the motor of said tractor for rotating said shaft to raise said blade.

2. A bulldozer having in combination with a tractor and a frame member, motor and transmission thereof, a blade extending transversely in front of said tractor, an angle lever pivotally connecting said blade to said frame member so as to swing upwardly, a shaft adjacent the rear of said tractor, a crank arm secured to said shaft, a link connecting said lever and crank arm for swinging said blade, a driving means for said shaft, a clutch for connecting said shaft to the transmission of said tractor, and means for locking said blade in different positions.

3. A bulldozer having in combination with a tractor and a frame member thereof, a blade extending transversely in front of said tractor, a bell crank lever carrying said blade and pivotally mounted on said frame member substantially at the longitudinal center thereof, a shaft journaled in the rear portion of said tractor and extending transversely thereof, means connecting said lever and shaft whereby said blade can be raised by rotation of said shaft and means adapted to be connected to the transmission of said tractor for rotating said shaft.

4. A bulldozer having in combination with a tractor and a frame member thereof, a blade extending transversely in front of said tractor, a bell crank lever pivotally supporting said blade upon said frame member, means for swinging said bell crank lever to raise said blade and flexible means connected to the front part of said tractor and to said blade for supporting said blade in its lowest position.

5. A bulldozer having in combination with a tractor having a frame member, a blade extending transversely of said tractor in front of the same, a lever connected to said blade and pivoted at the side of said frame member, said lever having a rearwardly extending arm, a shaft journaled in said tractor at the rear portion thereof, means connecting said shaft and said arm of said lever, said arm and means having relative movement longitudinally of said means and means for locking said arm and means against said relative longitudinal movement.

6. A bulldozer having in combination with a tractor and a frame member and transmission thereof, a blade extending transversely at the front of said tractor, a lever having its front end connected to said blade, a fulcrum bearing for said lever secured to the frame member of said tractor, a shaft extending transversely of the tractor adjacent the rear end thereof, a link connecting said shaft and said lever, the end of said lever being movable longitudinally of said link, means for locking said lever against movement longitudinally of said link and means adapted to be connected to the transmission of the tractor for oscillating said shaft to swing said lever and lift said blade.

7. A machine of the class described having in combination with a tractor, frame members and transmission thereof, a blade extending transversely in front of said tractor, levers having rearwardly and upwardly extending arms and having forwardly extending arms connected to said blade and pivoted to the tractor frame members at the sides thereof, a shaft extending transversely of the tractor adjacent the rear thereof, means connecting said shaft and the rearwardly and upwardly extending arms of said levers, means for connecting said shaft to the transmission of said tractor for turning said shaft, a brake mechanism for holding said levers and blade against upward and downward movement in various positions and a single means for controlling said brake mechanism and last mentioned means.

8. A machine of the class described having in combination with a tractor, frame members and transmission thereof, a blade extending transversely in front of said tractor, members connected to said blade and fulcrumed on the frame members of the tractor for lifting said blade, a shaft extending transversely of the tractor adjacent the rear thereof, means connecting said members and shaft, a clutch mechanism for connecting said shaft to the transmission of the tractor, a brake means for holding said shaft in various positions, means actuated by the operator for controlling said clutch mechanism and brake means, and means carried by said shaft for disconnecting said clutch mechanism when said shaft has been turned a certain amount and said blade raised a certain amount.

9. A machine of the class described having in combination with a tractor and frame members and transmission thereof, a blade extending transversely in front of said tractor, means for raising said blade including a shaft extending transversely of said tractor adjacent the rear thereof, a gear member connected to said shaft, a pinion meshing with said gear member, a shaft carrying said pinion, a beveled gear journaled on said shaft, a pinion meshing with said beveled gear and connected to said transmission to be driven thereby, and a clutch for connecting said beveled gear to said second mentioned shaft whereby said first mentioned shaft will be driven from said transmission.

10. The structure set forth in claim 9, a brake mechanism connected to said second mentioned shaft for holding the same and said first mentioned shaft in various positions.

11. The structure set forth in claim 9, an arm carried by said first mentioned shaft and means connecting said arm to said clutch mechanism whereby said clutch mechanism will be disengaged when said gear member and first mentioned shaft have been turned a certain distance.

12. The structure set forth in claim 9, a brake mechanism carried by said second mentioned shaft and adapted to hold the same and said first mentioned shaft in various positions and a single lever for controlling said clutch and said brake mechanism.

13. A bulldozer having in combination with a tractor and a frame member thereof, a blade extending transversely in front of said tractor, a lever carrying said blade and pivotally mounted on said frame member, said lever having an arm extending upwardly and rearwardly from its fulcrum, a shaft journaled in the rear portion of said tractor and extending transversely thereof, an arm secured to said shaft, a link connecting said last mentioned arm and said lever arm whereby said blade can be raised by rotation of said shaft and means adapted to be connected to the transmission of said tractor for rotating said shaft.

14. A bulldozer having in combination with a tractor, frame members and transmission thereof, a blade extending transversely at the front of said tractor, levers connected at their forward ends to said blade, fulcrum shafts mounted on said frame members at each side of the tractor on which said levers are fulcrumed, a shaft extending transversely of the tractor adjacent the rear thereof, arms on the ends of said shaft, links connecting said arms to said levers and means for connecting said shaft to the transmission of the tractor for rotating said shaft.

15. A machine of the class described having in combination with a tractor and frame members and transmission thereof, a blade extending transversely in front of said tractor, angle levers having forwardly projecting arms carrying said blade and having rearwardly and upwardly extending arms, a gear casing mounted at the rear of said tractor, a shaft extending transversely through said gear casing, rigid pivotally connected members connected to the ends of said shaft and said last mentioned arms respectively for raising said blade upon rotation of said shaft and means adapted to be connected to said transmission for rotating said shaft.

16. A bulldozer having in combination with a tractor having a frame member, a lever having a fulcrum point adjacent the longitudinal center of said frame member, said lever having one arm extending forwardly, a blade extending transversely at the front of said tractor, means connecting said lever and blade and rigidly securing said blade against vertical movement relatively to said lever, said lever having another arm extending rearwardly from its fulcrum, a shaft extending transversely of said tractor at the rear thereof, means for rotating said shaft from the motor of said tractor, an arm secured to and oscillatable by said shaft, and a link connected to said arm and the rearwardly extending arm of said lever.

17. A device of the class described having in combination with a tractor comprising endless tracks, frame members, bell crank levers pivotally connected to said frame members at the sides of the tractor adjacent the longitudinal center thereof, said levers having forwardly extending arms, a blade carried by the front ends of said arms extending across the front of said tractor, said levers also having arms extending upwardly and rearwardly from the pivots thereof, and rotating means disposed at the rear of the tractor and directly connected to the ends of said upwardly and rearwardly extending arms for swinging said levers and raising said blade.

18. A device of the class described having in combination with a tractor comprising endless tracks, frame members, angle levers pivotally connected to said frame members adjacent the vertices of their angles, said levers having forwardly extending arms, a blade connected to the forward end of said arms extending transversely at the front of said tractor, said levers having arms extending rearwardly and upwardly from their pivots and terminating short of the rear end of said tractor, means connected to the upper ends of said latter arms, and means located at the rear of said tractor for moving said last mentioned means and swinging said levers to raise said blade.

19. A device of the class described having in combination with a tractor comprising endless tracks, frame members, angle levers pivotally connected adjacent the vertices of their angles to said frame members at the sides of said tractor respectively, said levers having arms extending forwardly of said frame members, a blade secured to the forward end of said arms and extending transversely of said tractor at the front thereof, shoes carried by said arms adjacent said blade adapted to engage the ground in the operation of said blade, said levers having upwardly and rearwardly extending arms terminating short of the rear end of said tractor, a power means disposed at the rear of said tractor, and means connecting the ends of said latter arms and said power means for moving said levers and raising said blade.

20. A device of the class described having in combination with a tractor comprising endless tracks, frame members, angle levers pivotally connected to said frame members adjacent the longitudinal centers of said endless tracks, said levers being pivoted adjacent the vertices of their angles and having forwardly extending arms, a blade carried by the front end of said arms extending across the front of said tractor, said levers also having arms extending upwardly and rearwardly from the pivots thereof and terminating short of the rear end of said tractor, a shaft journaled for oscillation extending across the rear end of said tractor, arms secured to the ends of said shaft respectively, and links respectively connecting said last mentioned arms to the upwardly and rearwardly extending arms of said levers.

21. A device of the class described having in combination with a tractor comprising endless tracks, frame members, rigid levers pivotally connected to said frame members adjacent the longitudinal centers of said endless tracks, said levers having forwardly extending arms and having rearwardly extending arms terminating short of the rear end of said tractor, a blade carried by the front ends of said first mentioned arms and extending across the front of said tractor, a shaft extending across said tractor adjacent the rear end thereof, arms secured to the ends of said shaft and links connecting the ends of said last mentioned arms to the rearwardly extending arms of said levers.

22. A device of the class described having in combination with a tractor, frame members, rigid levers pivotally connected to said frame members about an axis disposed substantially centrally of said tractor longitudinally thereof and extending transversely of said tractor, said levers having forwardly extending arms, a blade carried by the front ends of said arms and extending across the front of said tractor, said levers having arms extending upwardly and rearwardly from said axis, a shaft extending transversely of said tractor adjacent the rear end thereof, arms secured to the ends of said shaft, and links extending forwardly from said last mentioned arms and pivotally connected to the rearwardly extending arms of said levers.

23. A device of the class described having in combination with a tractor comprising endless tracks, frame members, rigid levers pivotally connected to said tractor about an axis extending transversely thereof and disposed substantially centrally of said tractor longitudinally thereof, said levers having arms extending forwardly from their pivots, a blade carried by the front ends of said arms and extending across the front of said tractor, a shaft extending across said tractor adjacent the rear end thereof, arms secured to the ends of said shaft, links pivotally connected to the ends of said last mentioned arms and extending forwardly and pivotally connected at their other ends to the rearwardly extending arms of said levers respectively, and means for oscillating said shaft.

24. A device of the class described, having in combination with a tractor comprising endless tracks and frame members, levers pivotally connected to said frame members adjacent the longitudinal centers of said endless tracks, said levers having arms extending forwardly from their pivots, a blade carried by the front end of said arms extending across the front end of said tractor, said levers terminating short of the rear end of said tractor, a shaft journaled for oscillation extending across the rear end of said tractor, arms secured to the ends of said shaft respectively, and links respectively connecting said last mentioned arms to said lever arms, and means for oscillating said shaft whereby said levers can be swung about their pivots and said blade raised and lowered.

25. A device of the class described, having in combination with a tractor comprising endless tracks and frame members, levers pivotally connected to said frame members at substantially the longitudinal centers of said endless tracks, said levers having arms extending forwardly from their pivots, a blade carried by the front ends of said arms and extending across the front end of said tractor, said levers also having arms extending above said pivots and said levers terminating short of the rear end of said tractor, means pivotally connected adjacent the upper ends of said last mentioned arms and extending to the rear end of said tractor, and means at the rear end of said tractor connected to said last mentioned means for moving the same rearwardly to swing said levers about said pivots and raise said blade.

26. A device of the class described having in combination with a tractor, frame members, rigid levers pivotally connected to said frame members about an axis disposed substantially centrally of said tractor longitudinally thereof and extending transversely of said tractor, said levers having forwardly extending arms, a blade carried by the front ends of said arms and extending across the front of said tractor, said levers terminating short of the rear end of said tractor and having arms extending above said axis, means including members pivotally connected respectively to the upper ends of said latter arms and extending toward the rear end of said tractor, and oscillating means at the rear end of the tractor engaging said means for moving the same rearwardly to swing said levers and raise said blade.

JOHN R. RITCHIE.